(12) United States Patent
Shimizu

(10) Patent No.: US 10,518,564 B2
(45) Date of Patent: Dec. 31, 2019

(54) AIR FILTER AND IMAGE FORMING APPARATUS INCORPORATING SAME

(71) Applicant: Keiichi Shimizu, Kanagawa (JP)

(72) Inventor: Keiichi Shimizu, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/123,097

(22) Filed: Sep. 6, 2018

(65) Prior Publication Data

US 2019/0100045 A1    Apr. 4, 2019

(30) Foreign Application Priority Data

Oct. 2, 2017    (JP) .................. 2017-192682

(51) Int. Cl.
| | | |
|---|---|---|
| B41J 29/00 | (2006.01) | |
| B41J 29/377 | (2006.01) | |
| H04N 1/00 | (2006.01) | |
| B41J 29/13 | (2006.01) | |
| B41J 29/02 | (2006.01) | |

(52) U.S. Cl.
CPC ............ *B41J 29/377* (2013.01); *B41J 29/02* (2013.01); *B41J 29/13* (2013.01); *H04N 1/00909* (2013.01); *H04N 1/00519* (2013.01)

(58) Field of Classification Search
CPC .......... B41J 29/02; B41J 29/13; B41J 29/377; H04N 1/00519; H04N 1/00909; G03G 15/206; G03G 15/2017; G03G 2221/1645
See application file for complete search history.

(56) References Cited

U.S. PATENT DOCUMENTS

| | | | | |
|---|---|---|---|---|
| 4,693,588 A * | 9/1987 | Yarbrough | ........... | G03G 21/206 219/216 |
| 6,141,512 A * | 10/2000 | Nagano | .............. | G03G 21/1814 399/92 |
| 7,020,411 B2 * | 3/2006 | Awaya | ............... | G03G 15/6573 399/92 |
| 8,218,157 B2 * | 7/2012 | Saito | ........................ | H04N 1/00 347/101 |
| 8,488,989 B2 * | 7/2013 | Ukai | ...................... | G03G 21/20 399/92 |
| 2003/0185584 A1 * | 10/2003 | Hirose | ............... | G03G 21/1814 399/92 |
| 2006/0072933 A1 * | 4/2006 | Miyamoto | ........... | G03G 21/206 399/92 |

(Continued)

FOREIGN PATENT DOCUMENTS

| | | |
|---|---|---|
| JP | 11-161122 | 6/1999 |
| JP | 2003-307996 | 10/2003 |

(Continued)

*Primary Examiner* — Francis C Gray
(74) *Attorney, Agent, or Firm* — Harness, Dickey & Pierce, P.L.C.

(57) ABSTRACT

An air filter for an image forming apparatus includes a housing including an air intake part and an air exhaust part, a fan disposed in the housing to form an air flow from the air intake part to the air exhaust part, and a filter disposed in the housing to filter the air flow. The fan draws air in a suction direction along an ejection direction of a sheet ejected from an ejection port in the image forming apparatus.

20 Claims, 10 Drawing Sheets

(56) References Cited

U.S. PATENT DOCUMENTS

2007/0110469 A1* 5/2007 Kasai ................ G03G 15/6552
　　　　　　　　　　　　　　　　　　　399/93
2007/0121142 A1* 5/2007 Kasai ................... G03G 21/206
　　　　　　　　　　　　　　　　　　　358/1.12
2008/0187349 A1* 8/2008 Yoshihara .......... H05K 7/20145
　　　　　　　　　　　　　　　　　　　399/92

FOREIGN PATENT DOCUMENTS

| JP | 2007-156418 | 6/2007 |
| JP | 2007-171913 | 7/2007 |
| JP | 2011-107500 | 6/2011 |
| JP | 2013-190520 | 9/2013 |
| JP | 2018-091880 | 6/2018 |

* cited by examiner

FIG. 3
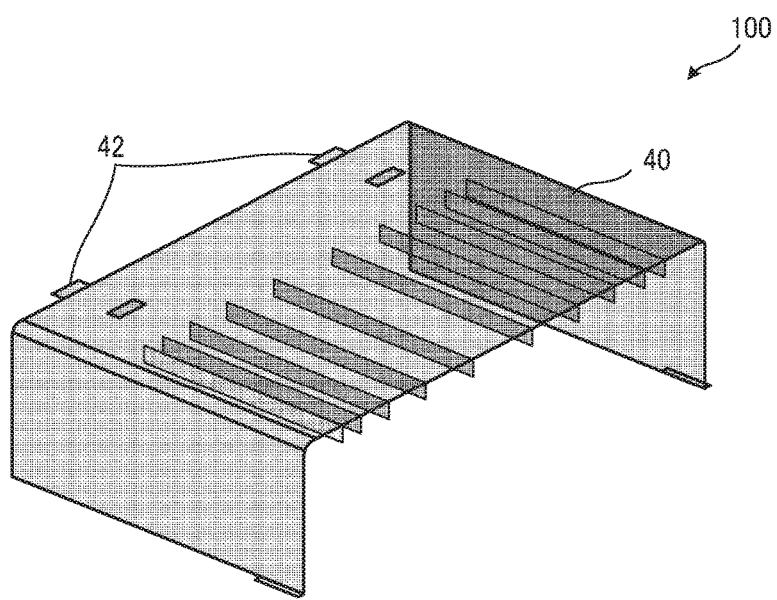
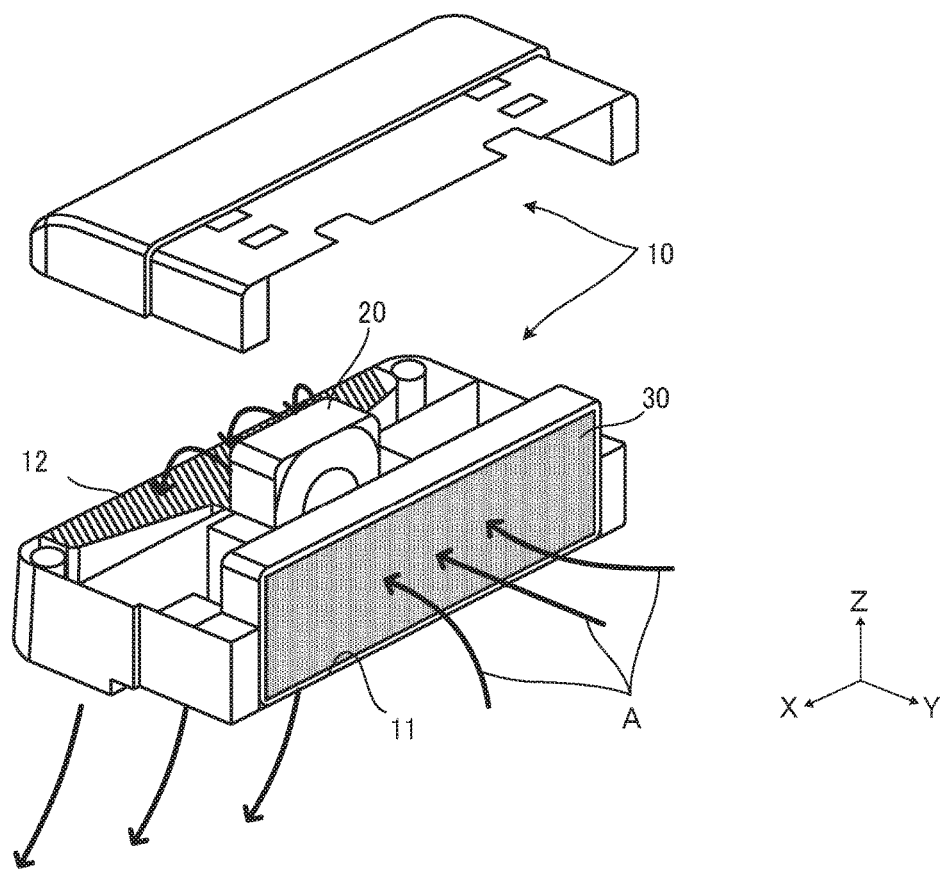

AIR FILTER AND IMAGE FORMING APPARATUS INCORPORATING SAME

CROSS-REFERENCE TO RELATED APPLICATION

This patent application is based on and claims priority pursuant to 35 U.S.C. § 119 to Japanese Patent Application No. 2017-192682, filed on Oct. 2, 2017 in the Japanese Patent Office, the entire disclosure of which is hereby incorporated by reference herein.

BACKGROUND

Technical Field

Aspects of the present disclosure generally relate to an air filter and an image forming apparatus incorporating the air filter.

Description of the Related Art

An image forming apparatus such as a multifunction peripheral or a printer includes a device that removes odors and chemical emissions such as ozone and dust, which are generated during use.

Requirements for the device that removes odors and chemical emissions are different between destinations that have different certification requirement standards. However, actual product specifications are generally determined in accordance with a destination with the most stringent standard, which may be too high for some destinations. Additionally, when the market requests more stringent specifications for a mass-produced model of image forming apparatus, it is not easy for the maker to satisfy the more stringent specifications.

SUMMARY

This specification describes an improved air filter for an image forming apparatus that includes a housing including an air intake part and an air exhaust part, a fan disposed in the housing to form an air flow from the air intake part to the air exhaust part, and a filter disposed in the housing to filter the air flow. The fan draws air in a suction direction along an ejection direction of a sheet ejected from an ejection port in the image forming apparatus.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIG. 3 is an exploded perspective view of the air filter illustrated in FIG. 2;

Figure 1:
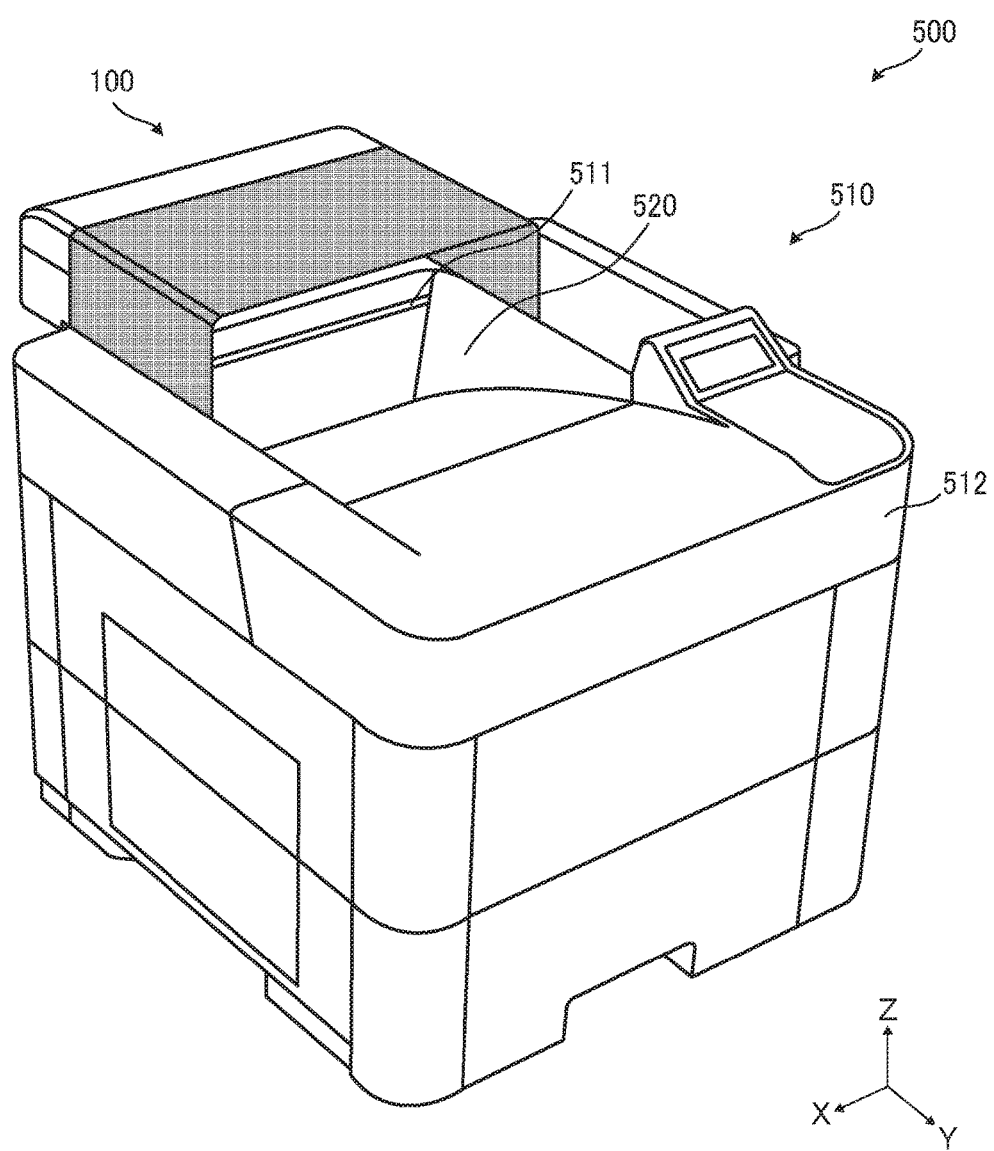
FIG. 1 is a perspective view of an image forming apparatus with an air filter according to an embodiment of the present disclosure installed.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings illustrating the following embodiments, the same reference codes are allocated to elements (members or components) having the same function or shape and redundant descriptions thereof are omitted below.

FIG. 1 illustrates an image forming apparatus installed with an air filter according to an embodiment of the present disclosure.

As illustrated in FIG. 1, the image forming apparatus 500 includes an image forming apparatus body 510 and an air filter 100 installed in the image forming apparatus body 510.

The image forming apparatus body 510 includes an ejection port 511 to eject a sheet that is a recording medium on which an image is formed toward a sheet ejection space 520 in which the sheet is stacked.

The image forming apparatus body 510 includes a first cover 512 at an upper portion of the image forming apparatus body 510 that, when opened, allows access to an interior of the image forming apparatus body 510.

Figure 9:
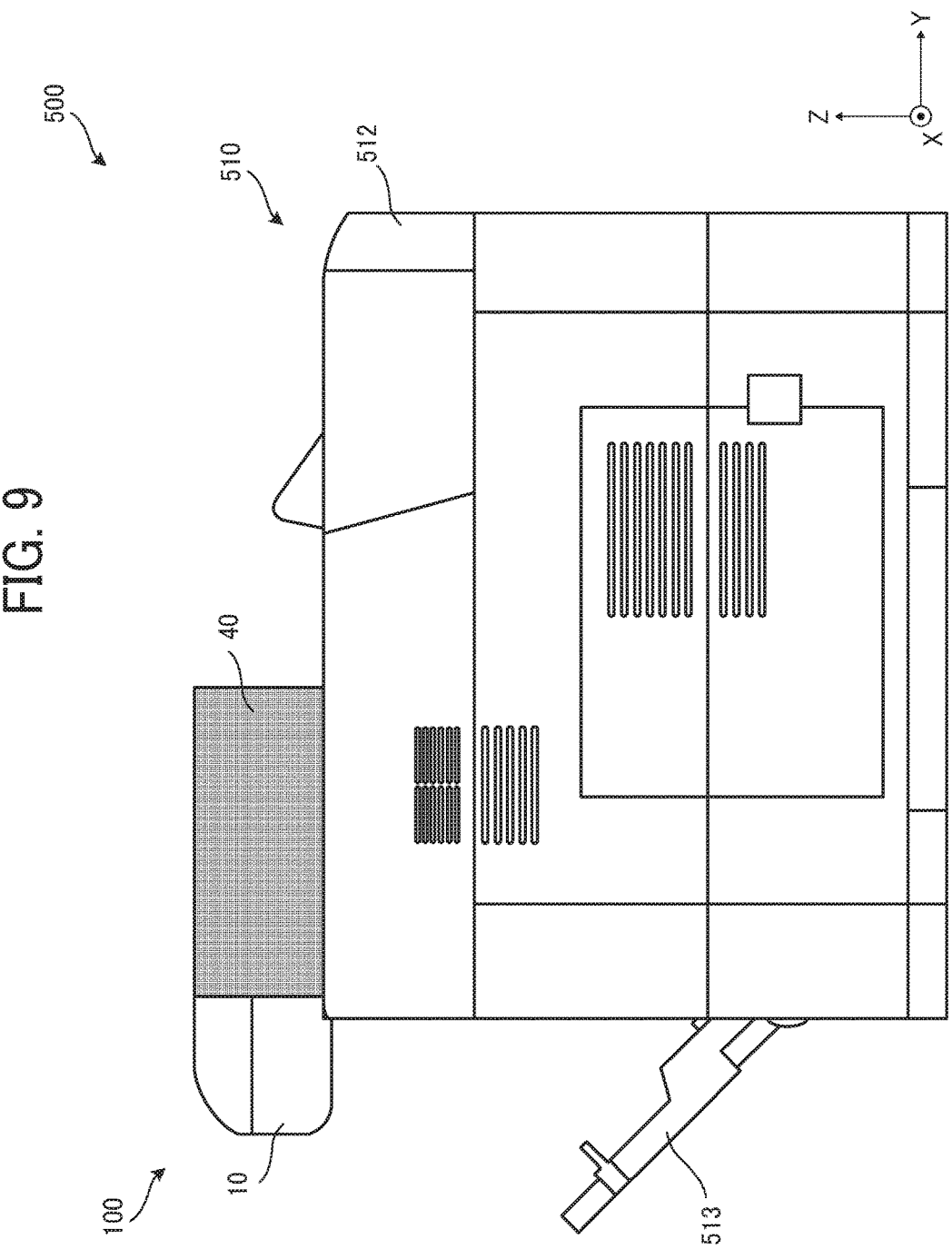
FIG. 9 is a right-side view of the image forming apparatus in which a second cover is opened.

As illustrated in FIG. 9, the image forming apparatus body 510 includes a second cover 513 disposed on the back of the image forming apparatus body 510 that allows access to the interior of the image forming apparatus body 510.

The image forming apparatus 500 is an image forming apparatus, such as a printer, including no scanner.

In all the figures, the direction (hereinafter, X direction) indicated by arrow X represents the lateral direction of the image forming apparatus 500, that is, the width direction of the sheet ejected from the ejection port 511, and the direction (hereinafter, Y direction) indicated by arrow Y represents the front-back direction of the image forming apparatus 500, that is, an ejection direction of a sheet in which the sheet is ejected from the ejection port 511. The side on which a control panel is provided is the front of the image forming apparatus 500. The direction (hereinafter, Z direction) indicated by arrow Z represents the vertical direction of the image forming apparatus 500.

Figure 2:
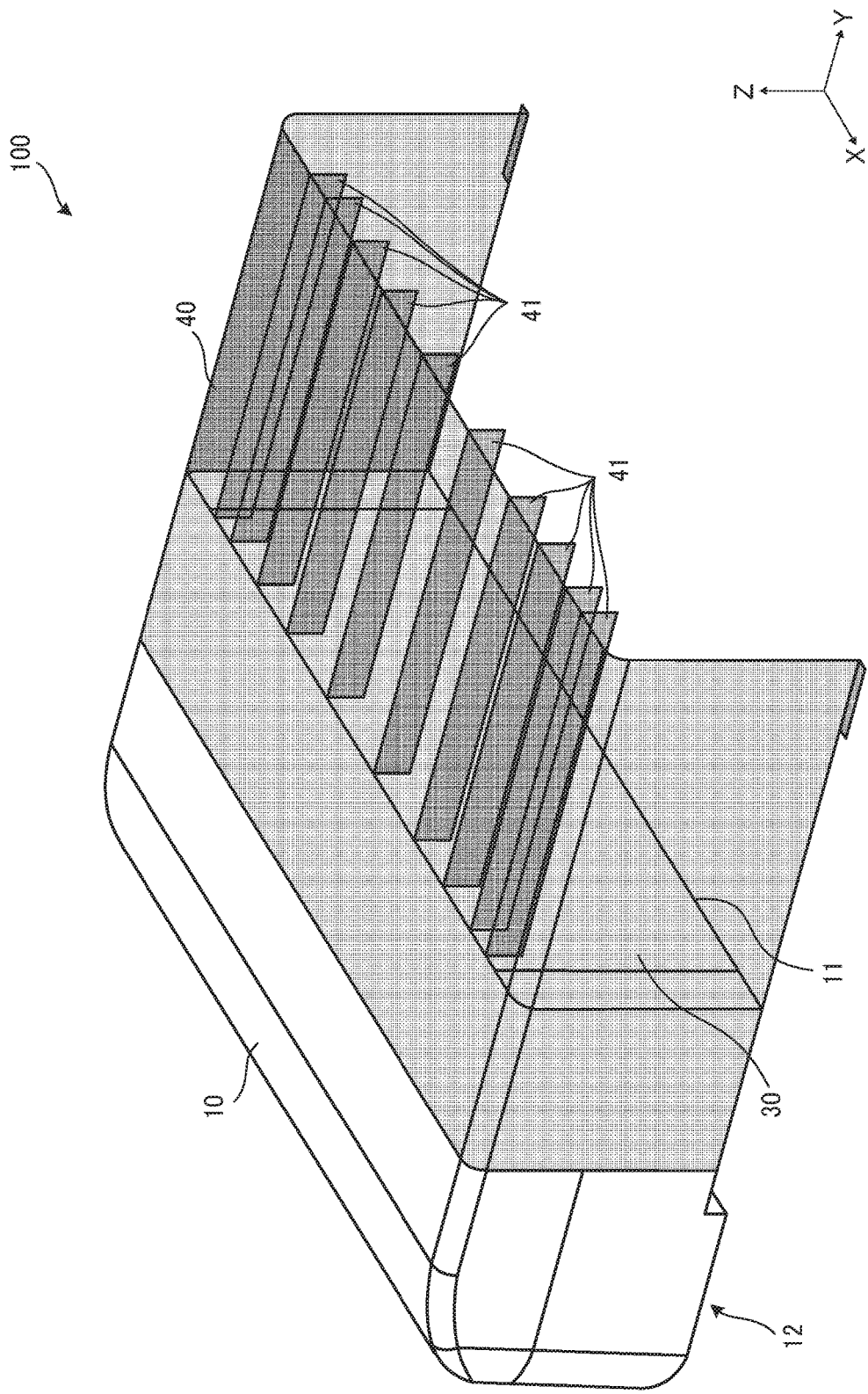
FIG. 2 is a perspective view of an example of the air filter.

As illustrated in FIG. 2 and FIG. 3, the air filter 100 includes a housing 10 to form an airflow path. The housing 10 includes an air intake part 11 forming an intake to take in air into the housing 10 and an air exhaust part 12 forming an exhaust port to expel the air to the outside of the housing 10.

The air filter 100 includes a fan 20 disposed in the housing 10 to form an air flow from the air intake part 11 to the air exhaust part 12.

The air filter 100 includes a filter 30 to pass the air flow and filter the air in the air flow.

The air filter 100 includes a cover 40 disposed on the housing 10 to form an air flow from the ejection port 511 to the air intake part 11.

The air filter 100 is an external device that can be attached to and detached from the image forming apparatus 500.

The air filter 100 is mounted on the image forming apparatus body 510 to occupy the position in which the air intake part 11 draws exhaust air from the ejection port 511 and air in the sheet ejection space 520 when the fan 20 is driven. When the air filter 100 is mounted on the image forming apparatus body 510, a suction direction of the fan 20 is along the same direction as the ejection direction of the sheet ejected from the ejection port 511. A state in which the suction direction of the fan 20 is along the ejection direction does not mean that the suction direction is perfectly parallel to the ejection direction and includes fluctuation due to turbulence in the air flow. When the suction direction of the fan 20 is along the ejection direction, a rotational plane of the fan 20 and an opening surface of the ejection port 511 are oriented in the Y direction.

The housing 10 is disposed above the ejection port 511, that is, downstream from the ejection port 511 in the Z direction and upstream from the ejection port 511 in the Y direction. The position in which the air filter 100 is disposed does not hamper sheet ejection from the ejection port 511 and a user operation in which the user of the image forming apparatus 500 removes the ejected sheet.

The air filter 100 may be fixed on the image forming apparatus 500 by a surface fastener such as an adhesive tape or a Magic Tape (registered trademark) or a structural element such as a screw or a claw.

The air intake part 11 has a rectangular shape, and the X direction is a longitudinal direction of the air intake part 11. A direction of the air flowing through the air intake part 11 is along the ejection direction of the sheet. A state in which the direction of the air flowing through the air intake part 11 is along the ejection direction of the sheet does not mean that the direction of air flowing is perfectly parallel to the ejection direction, and includes fluctuation due to turbulence in the air flow. In this state, the opening surface of the air intake part 11 and the opening surface of the ejection port 511 are oriented in the Y direction.

In the present embodiment, the rotational plane of the fan 20 and the opening surface of the air intake part 11 are oriented in the Y direction, but the opening surface inclined within 45 degrees with respect to the rotational plane of the fan 20 can obtain sufficient intake capability.

Figure 6:
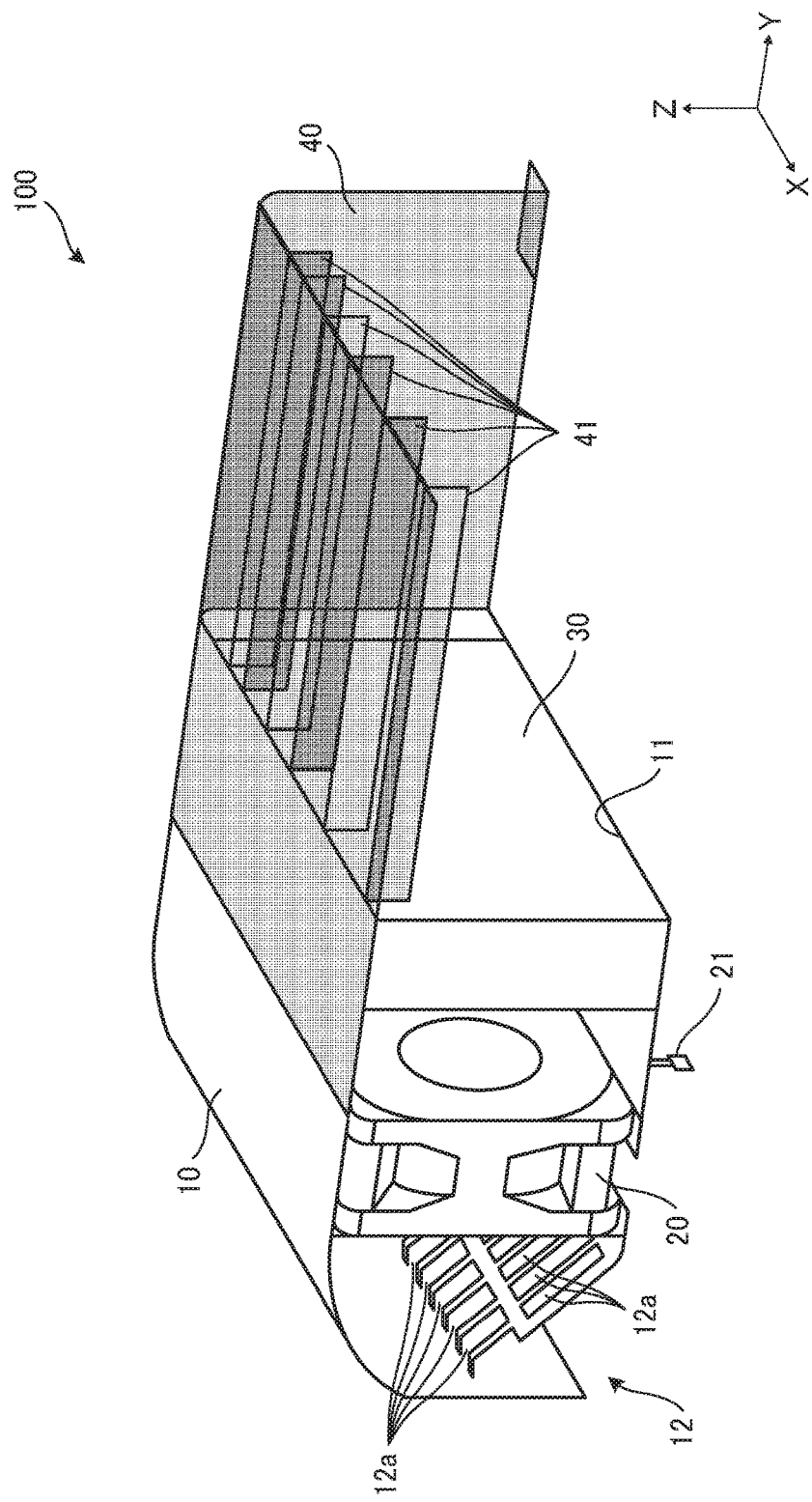
FIG. 6 is a cross-sectional perspective view of the air filter illustrated in FIG. 2.

As illustrated in FIG. 6, the exhaust part 12 includes slits 12*a*. As indicated by arrows A in FIG. 3, the air drawn into the housing 10 from the air intake part 11 by the fan 20 is exhausted upstream in the Z direction from the slit 12*a*, that is, downward.

Figure 4:
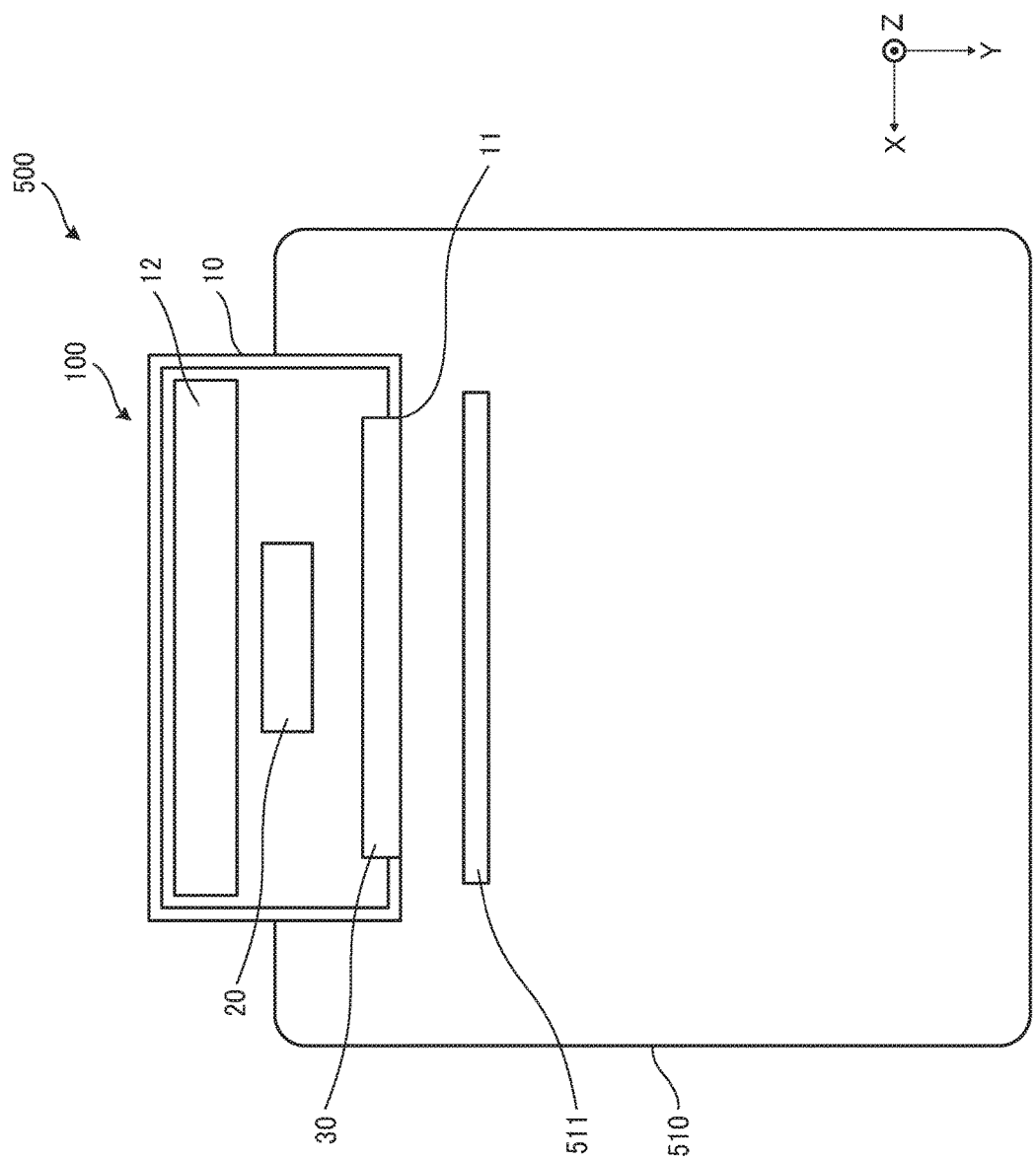
FIG. 4 is a top view of the image forming apparatus with the air filter illustrated in FIG. 1 installed.

As illustrated in FIG. 4, the fan 20 is disposed at a position corresponding to a central portion of the air intake part 11 in the X direction in the housing 10.

The fan 20 is disposed between the air intake part 11 and the air exhaust part 12. The intake part 11, the fan 20, and the air exhaust part 12 are arranged in this order from the downstream side to the upstream side in the Y direction.

The fan 20 includes an electric fan motor. When the fan 20 is turned on, the fan 20 draws air from the air intake part 11 into the housing 10 and exhausts the air from the air exhaust part 12 to the outside of the housing 10.

Figure 5:
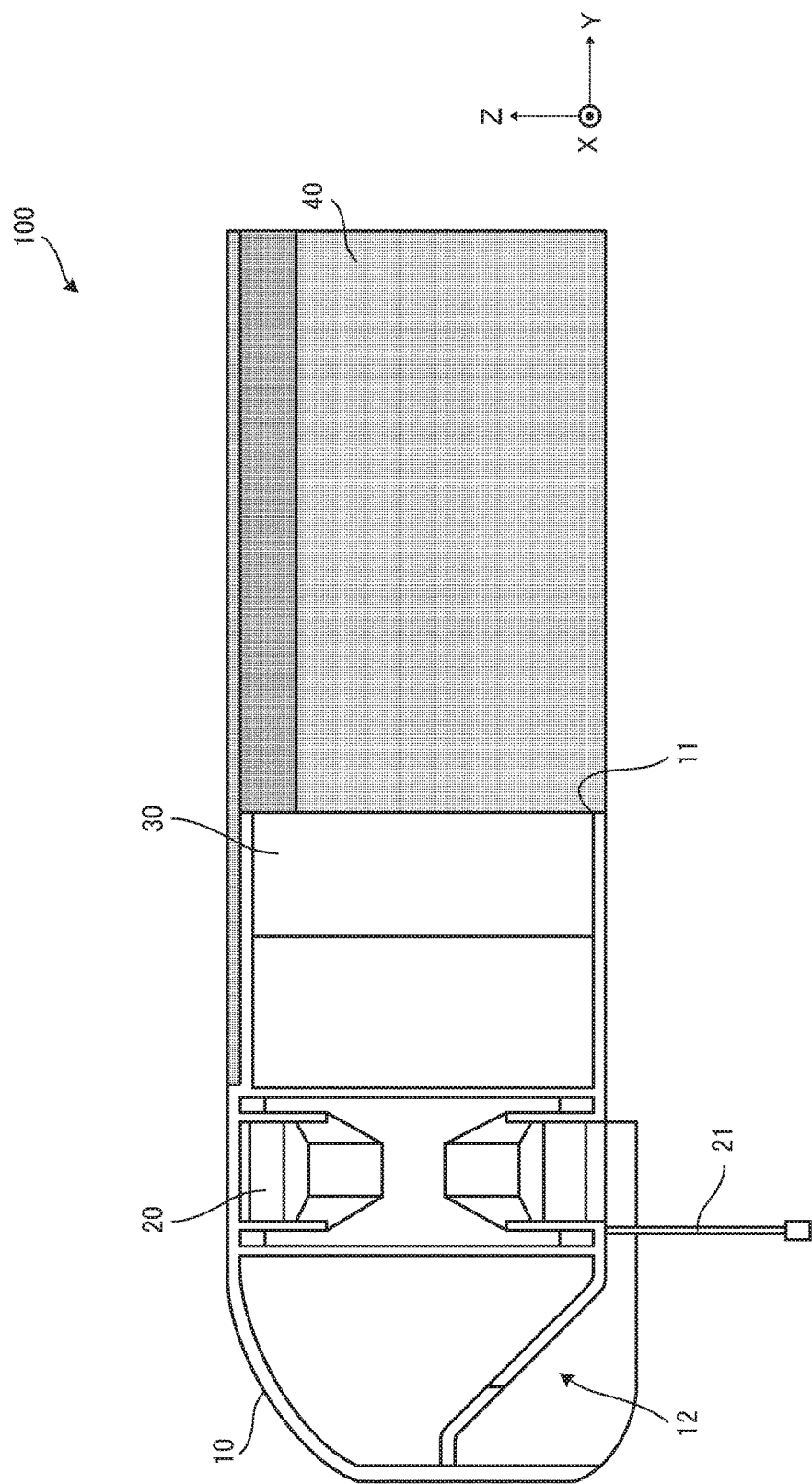
FIG. 5 is a cross-sectional view of the air filter illustrated in FIG. 2.

As illustrated in FIG. 5 and FIG. 6, the fan 20 includes a conducting wire connector 21 that electrically connects the fan 20 and a board in the image forming apparatus 500. Via the conducting wire connector 21, power is supplied from the image forming apparatus 500 to the fan motor. A central processing unit (CPU) on the board controls the power supplied to the fan 20 to supply the power during image formation.

The power may be supplied from an image data input terminal such as a universal serial bus (USB) terminal of the image forming apparatus 500 to the fan motor. This enables any image forming apparatus to use the air filter 100 irrespective of the destination, power supply voltage, and manufacturer of the image forming apparatus because almost all image forming apparatuses have image data input terminals.

When the image forming apparatus 500 does not supply the power, a battery type or rechargeable fan motor may be used to drive the fan 20.

The filter 30 is disposed in the air intake part 11. As illustrated in FIG. 4, the filter 30 is provided side by side along the Y direction together with the air intake part 11, the fan 20, and the air exhaust part 12.

The filter 30 may be changed into any type of filter, such as an odor filter, an ozone filter, a volatile organic compound (VOC) filter, or a particulate filter, depending on the intended use.

The cover 40 is detachable from the housing 10. As illustrated in FIG. 3, the cover 40 includes a connecting portion 42 such as a hook portion and a claw, and is integrated with the housing 10 by fitting the connecting portion 42 into the housing 10.

As illustrated in FIG. 2 and FIG. 6, the cover 40 has a plurality of ribs 41, each extending in the Y direction, aligned in the X direction on a surface of the cover 40 facing a path of the air flow. The ribs 41 are arranged with intervals corresponding to the sizes of sheets used in the image forming apparatus 500, and the height of the ribs 41 is set to a height which does not hinder sheet discharge. The ribs 41 prevent the sheet from sticking to the cover 40 due to the air flow drawn upstream in the Y direction during the sheet ejection.

The cover 40 is made of a transparent or translucent material, such as plastic, to ensure that the ejected sheet is visible and make the air filter 100 as a whole appear smaller.

Figure 7:
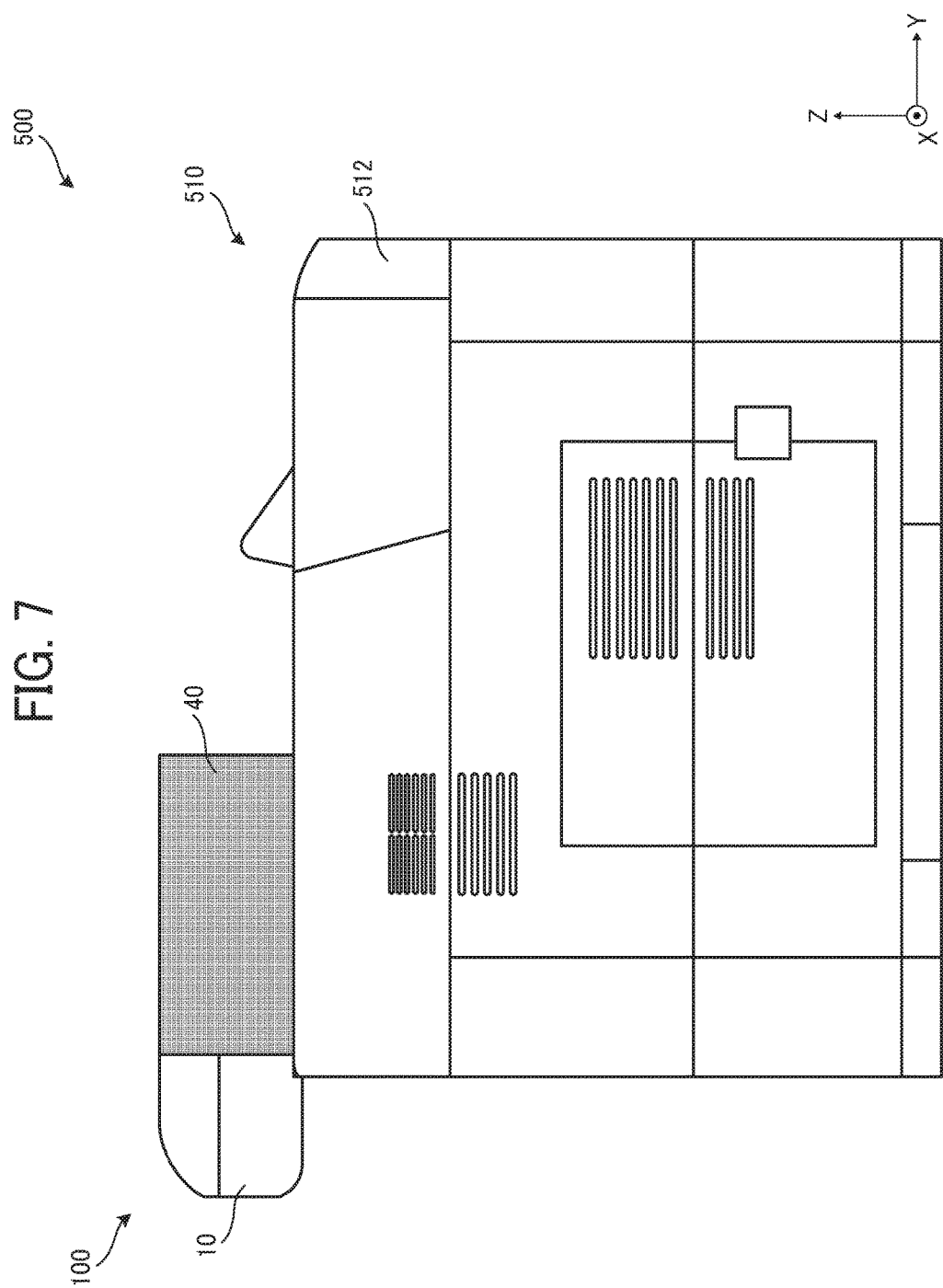
FIG. 7 is a right-side view of the image forming apparatus with the air filter illustrated in FIG. 1 installed.
Figure 8:
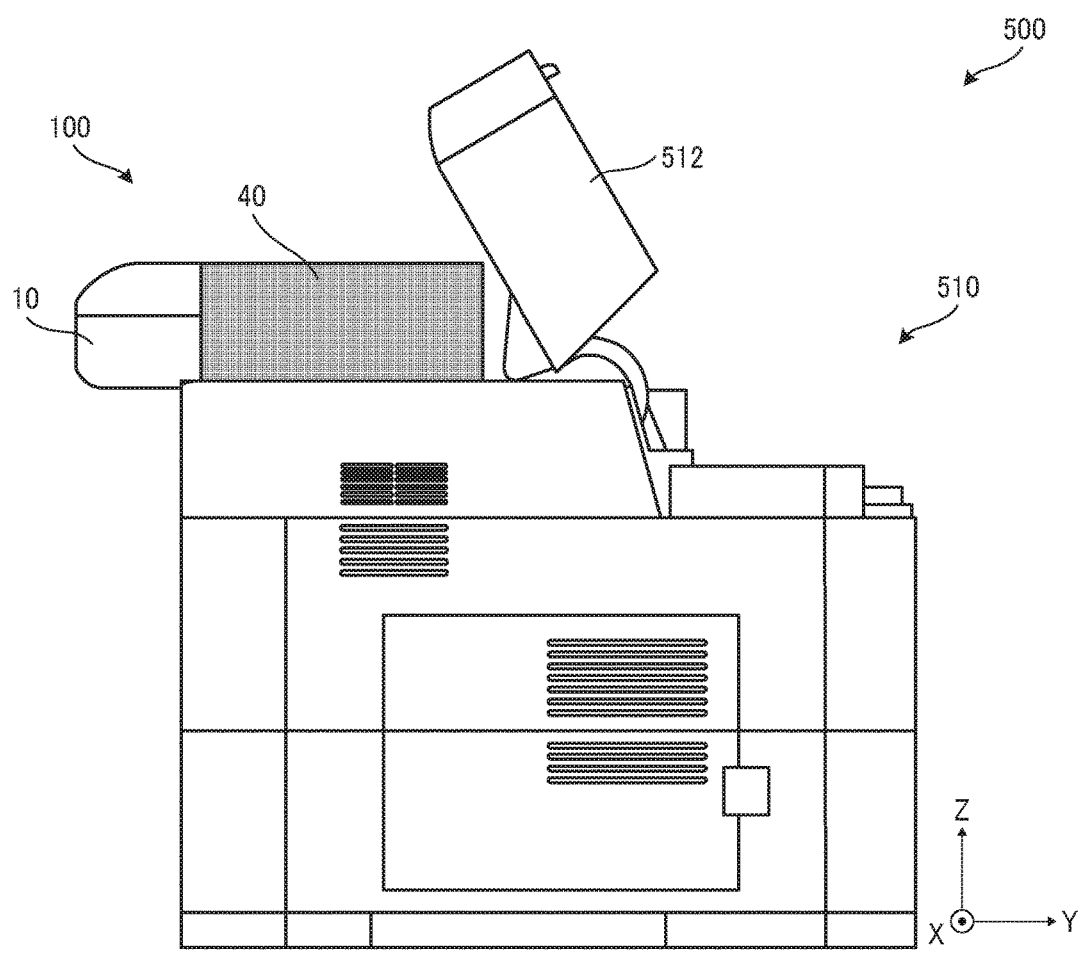
FIG. 8 is a right-side view of the image forming apparatus in which a first cover is opened.

FIG. 7 illustrates the image forming apparatus 500 in which the first cover 512 and the second cover 513 are closed. FIG. 8 illustrates the image forming apparatus 500 with the first cover 512 opened. FIG. 9 illustrates the image forming apparatus 500 with the second cover 513 opened.

As illustrated in FIG. 8, in an open state in which the first cover 512 opens the interior of the image forming apparatus body 510, the cover 40 is designed not to interfere with the first cover 512. The open state is a state in which the interior is not closed and includes not only a state in which the first cover 512 is fully opened but also a state in which the first cover 512 is slightly opened.

Opening of the first cover 512 enables maintenance and replacement of a toner cartridge in the image forming apparatus body 510 and removal of a sheet when a paper jam occurs, that is, jam processing. The above-described arrangement of the air filter 100 does not hamper replacement of consumables and clearance of paper jams when the image forming apparatus changes from the state illustrated in FIG. 7 to the state illustrated in FIG. 8.

As illustrated in FIG. 9, when the second cover 513 is opened to expose the interior of the image forming apparatus body 510, the housing 10 is disposed forward of the rear end of the second cover 513. Opening of the second cover 513 enables maintenance such as replacement of a fixing unit in the image forming apparatus body 510 and clearance of jams. The above-described arrangement of the air filter 100 does not hamper maintenance and jam clearance when the image forming apparatus changes from the state illustrated in FIG. 7 to the state illustrated in FIG. 9. Additionally, the above-described arrangement of the air filter 100 does not enlarge the footprint of the image forming apparatus 500.

A description is given of the operation of the above-described air filter 100.

The image forming apparatus 500 forms an image on the sheet and ejects the sheet on which the image has been formed to the sheet ejection space 520. When the sheet is ejected to the sheet ejection space 520, odors and other substances generated inside the image forming apparatus 500 are discharged from the ejection port 511 to the outside of the image forming apparatus body 510, and the odor and other substances are also generated from the ejected sheet.

The fan 20 draws air containing the generated substances and passes the air through the filter 30. Thus, the air filter 100 collects the generated substances. Then, the purified air is exhausted to the outside through the exhaust part 12. Since the purified air is discharged downward, the discharged air does not hit the face or body of a user.

The arrangement of the fan 20 at the position corresponding to the central portion of the air intake part 11 in the X direction in the housing 10 enables efficient suction of the air discharged from the ejection port 511 and prevents accumulation of dust.

For example, an image forming apparatus including no exhaust fan discharges most of exhaust air from an ejection port. In the present embodiment, the cover 40 disposed above the ejection port 511 prevents the air discharged from the ejection port 511 from diffusing upward and sideward and enables efficient correction of the air discharged from the ejection port 511.

Odors are often generated from ejected sheets. The air filter 100 capable of collecting air in the sheet ejection space 520 can reduce odors from the ejected sheets.

The air filter 100 can be mounted on an image forming apparatus that does not include an exhaust fan and a filter inside the image forming apparatus and discharges most of exhaust air from an ejection port. Even in an image forming apparatus including an exhaust fan and a filter, the exhaust air that has not passed through an exhaust fan may slightly leak from an ejection port. The air filter 100 can also be mounted on the image forming apparatus that requires high-performance specifications for taking measures against such exhaust air. As described above, the air filter 100 can be mounted on various image forming apparatuses and easily improve performance in filtering of the exhaust.

Although a preferred embodiment of the present disclosure is described above, the present disclosure is not limited to such a particular embodiment and it is possible to provide a variety of alteration or modification in the spirit and scope of the present disclosure as may be recited in what is claimed unless a particular limitation is provided in the above description.

Figure 10:
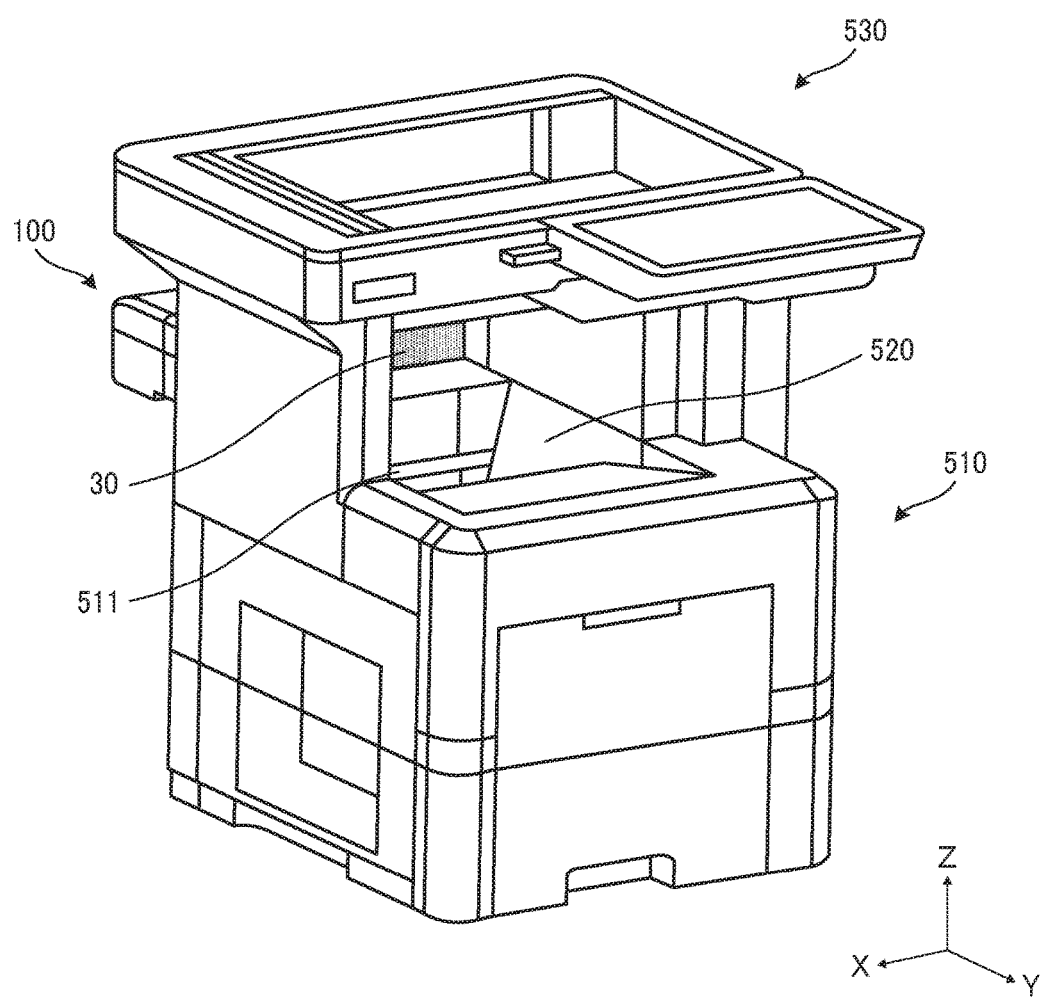
FIG. 10 is a perspective view illustrating a state in which the air filter is installed to the image forming apparatus including a scanner.

For example, as illustrated in FIG. 10, the image forming apparatus such as the multifunction peripheral having a scanner 530 above the image forming apparatus body 510 has the sheet ejection space 520 in a space formed by the image forming apparatus body 510 and the scanner 530. Therefore, the cover 40 does not need to cover the upper side and the lateral sides of the sheet ejection space 520. Since the cover 40 is detachably attached to the housing 10, only the housing 10 may be attached to the above-described image forming apparatus by detaching the cover 40.

According to the present embodiment, without changing the configuration of the image forming apparatus, the air filter can easily improve the performance in filtering of exhaust gas according to the standards and uses, and efficiently draw the exhaust gas from the image forming apparatus.

The effects obtained by the above-described embodiments are examples. The effects obtained by other embodiments are not limited to the above-described effects.

The above-described embodiments and variations are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

What is claimed is:

1. An air filter for an image forming apparatus, comprising:
   a housing including an air intake part and an air exhaust part;
   a fan disposed in the housing to produce an air flow from the air intake part to the air exhaust part, the fan being configured to draw air in a suction direction along an ejection direction of a sheet upon ejection from an ejection port in the image forming apparatus;
   a filter disposed in the housing to filter the air flow; and
   a cover, disposed on the housing, to form an air flow from the ejection port to the air intake part, the cover including a plurality of ribs extending in the ejection direction of the sheet on a surface facing a path of the air flow.

2. The air filter of claim 1,
   wherein a direction of the air flow through the air intake part is along the ejection direction.

3. The air filter of claim 1,
   wherein the fan is disposed at a position corresponding to a central portion of the air intake part, in a width direction of the sheet upon ejection from the ejection port.

4. The air filter of claim 1,
   wherein the fan is disposed between the air intake part and the air exhaust part, and
   wherein the air intake part, the fan, and the air exhaust part are arranged side by side along the ejection direction.

5. The air filter of claim 4,
   wherein the filter, the air intake part, the fan, and the air exhaust part are arranged side by side along the ejection direction.

6. The air filter of claim 1,
   wherein the cover is transparent or translucent.

7. The air filter of claim 1,
   wherein the cover is detachable from the housing.

8. An image forming apparatus, comprising:
the air filter of claim 1,
wherein a longitudinal direction of the air intake part is a width direction of the sheet upon ejection from the ejection port.

9. The image forming apparatus of claim 8,
wherein the housing is disposed above the ejection port and upstream from the ejection port in the ejection direction.

10. The image forming apparatus of claim 8, further comprising:
another cover disposed at an upper portion of the image forming apparatus to allow access to an interior of the image forming apparatus, and
wherein the cover of the air filter does not interfere with said another cover of the image forming apparatus upon said another cover being opened to expose the interior of the image forming apparatus.

11. The image forming apparatus of claim 8, further comprising:
another cover disposed on one side of the image forming apparatus to allow access to an interior of the image forming apparatus,
wherein the housing is disposed forward of a rear end of said another cover in the ejection direction of the sheet upon said another cover of the image forming apparatus being opened to expose the interior of the image forming apparatus.

12. The air filter of claim 1, wherein the plurality of ribs are arranged such that intervals, between pairs of ribs of the plurality of ribs, correspond to sizes of the sheets used in the image forming apparatus.

13. The air filter of claim 12, wherein a height of the plurality of ribs is set so as not to hinder sheet discharge from an ejection port in the image forming apparatus.

14. The air filter of claim 1, wherein a height of the plurality of ribs is set so as not to hinder sheet ejection from the ejection port in the image forming apparatus.

15. An image forming apparatus, comprising:
the air filter of claim 12,
wherein a longitudinal direction of the air intake part is a width direction of the sheet upon ejection from the ejection port.

16. The image forming apparatus of claim 15,
wherein the housing is disposed above the ejection port and upstream from the ejection port in the ejection direction.

17. The image forming apparatus of claim 15, further comprising:
another cover disposed at an upper portion of the image forming apparatus to allow access to an interior of the image forming apparatus, and
wherein the cover of the air filter does not interfere with said another cover of the image forming apparatus upon said another cover being opened to expose the interior of the image forming apparatus.

18. An image forming apparatus, comprising:
the air filter of claim 14,
wherein a longitudinal direction of the air intake part is a width direction of the sheet upon ejection from the ejection port.

19. The image forming apparatus of claim 18,
wherein the housing is disposed above the ejection port and upstream from the ejection port in the ejection direction.

20. The image forming apparatus of claim 18, further comprising:
another cover disposed at an upper portion of the image forming apparatus to allow access to an interior of the image forming apparatus, and
wherein the cover of the air filter does not interfere with said another cover of the image apparatus upon said another cover being opened to expose the interior of the image forming apparatus.

* * * * *